United States Patent
Castillo et al.

(10) Patent No.: US 9,939,458 B2
(45) Date of Patent: Apr. 10, 2018

(54) INSULATED ACCELEROMETER ASSEMBLY FOR HIGH VOLTAGE ENVIRONMENT

(71) Applicant: General Electric Company, Schenectady, NY (US)

(72) Inventors: Cesar Everardo Castillo, Albany, NY (US); Lawrence Edmund Jordan, Amsterdam, NY (US); Timothy Joseph Laskey, Saratoga Springs, NY (US); Ronald Irving Longwell, Boynton Beach, FL (US); David John Wardell, Ballston Spa, NY (US)

(73) Assignee: General Electric Company, Schenectady, NY (US)

( * ) Notice: Subject to any disclaimer, the term of this patent is extended or adjusted under 35 U.S.C. 154(b) by 322 days.

(21) Appl. No.: 14/837,560

(22) Filed: Aug. 27, 2015

(65) Prior Publication Data
US 2017/0059608 A1    Mar. 2, 2017

(51) Int. Cl.
*H02K 11/00* (2016.01)
*G01P 15/125* (2006.01)
*G01P 1/02* (2006.01)
*H02K 11/20* (2016.01)

(52) U.S. Cl.
CPC ............ *G01P 15/125* (2013.01); *G01P 1/023* (2013.01); *H02K 11/20* (2016.01)

(58) Field of Classification Search
CPC ........ G01P 15/125; G01P 1/023; H02K 11/20
USPC ...................................................... 310/68 B
See application file for complete search history.

(56) References Cited

U.S. PATENT DOCUMENTS

| | | | |
|---|---|---|---|
| 3,042,744 A | * | 7/1962 | Shoor ................. G01P 15/0907 |
| | | | 174/138 D |
| 4,246,161 A | | 1/1981 | Smith et al. |
| 4,417,476 A | | 11/1983 | Knowlton |
| 4,477,887 A | | 10/1984 | Berni |
| 4,513,749 A | | 4/1985 | Kino et al. |
| 4,734,976 A | | 4/1988 | Matson |
| 4,818,909 A | | 4/1989 | Balke |

(Continued)

FOREIGN PATENT DOCUMENTS

| | | |
|---|---|---|
| CN | 102324268 A | 1/2012 |
| CN | 104101610 A | 10/2014 |

(Continued)

OTHER PUBLICATIONS

SSA-100 High Sensitivity Fiber Bragg Grating Accelerometer, Aniber Company Limited, http://anibertech.com/SSA-100%20Accelerometer.html, date unknown, 3 pages.

(Continued)

*Primary Examiner* — Forrest M Phillips
(74) *Attorney, Agent, or Firm* — Ernest G. Cusick; Hoffman Warnick LLC (57) ABSTRACT

An insulated accelerometer assembly for a vibrated component in a high voltage environment may include: an accelerometer; a high dielectric strength potting compound encapsulating the accelerometer; a structurally supporting insulator layer such as a glass epoxy layer or mica layer(s) surrounding at least a portion of the high dielectric strength potting compound; and a conductive layer over at least a portion of the glass epoxy layer.

18 Claims, 10 Drawing Sheets

(56) References Cited

U.S. PATENT DOCUMENTS

| | | | |
|---|---|---|---|
| 5,130,600 A * | 7/1992 | Tomita | G01P 1/006 |
| | | | 310/319 |
| 5,146,776 A | 9/1992 | Twerdochlib et al. | |
| 5,469,745 A | 11/1995 | Twerdochlib | |
| 5,473,941 A * | 12/1995 | Judd | G01P 1/023 |
| | | | 73/514.34 |
| 5,684,718 A | 11/1997 | Jenkins et al. | |
| 7,276,839 B1 | 10/2007 | Monahan | |
| 7,372,279 B2 * | 5/2008 | Thompson | G01R 31/42 |
| | | | 324/520 |
| 7,533,572 B2 | 5/2009 | Twerdochlib | |
| 8,051,712 B2 * | 11/2011 | Younsi | G01P 1/023 |
| | | | 73/493 |
| 8,076,909 B2 | 12/2011 | Diatzikis et al. | |
| 8,186,223 B2 | 5/2012 | Dawson et al. | |
| 8,379,225 B2 | 2/2013 | Koste et al. | |
| 8,422,008 B2 | 4/2013 | Xia et al. | |
| 8,489,363 B2 | 7/2013 | Piccirillo et al. | |
| 8,514,409 B2 | 8/2013 | Koste et al. | |
| 8,520,986 B2 | 8/2013 | Dailey | |
| 2005/0052811 A1 * | 3/2005 | Shrier | G07B 1/00 |
| | | | 361/118 |
| 2007/0247613 A1 | 10/2007 | Cloutier et al. | |
| 2009/0284121 A1 * | 11/2009 | Lenz | H01J 1/14 |
| | | | 313/310 |
| 2010/0223995 A1 * | 9/2010 | Watanabe | B81B 7/0064 |
| | | | 73/431 |
| 2011/0227872 A1 * | 9/2011 | Huska | G06F 3/016 |
| | | | 345/174 |
| 2011/0242546 A1 | 10/2011 | Koste et al. | |
| 2012/0086947 A1 | 4/2012 | Bazzone | |
| 2012/0274258 A1 | 11/2012 | Andarawis et al. | |
| 2014/0013843 A1 | 1/2014 | Buck et al. | |
| 2015/0013791 A1 | 1/2015 | Banowetz et al. | |

FOREIGN PATENT DOCUMENTS

| | | |
|---|---|---|
| EP | 0627616 A2 | 12/1994 |
| EP | 2244081 A2 | 10/2010 |
| GB | 2473903 A | 3/2011 |
| GB | 2479263 A | 10/2011 |
| WO | 2009/079659 A1 | 6/2009 |

OTHER PUBLICATIONS

Turbo—condition monitoring solutions, VibroSystM, http://vibrosystm.com/energy/turbo-complete-monitoring-solutions/, date unknown, 2 pages.

Micron Optics Accelerometer os7100, Micron Optics, Inc, 2009, 3 pages.

Iris Power Endwinding Vibration Accelerometer (EVAII) Kit for Hydrogen-Cooled Generators, IRIS Power, Ver 1—Apr. 2015, date unknown, 2 pages.

Iris Power EVTracll, Continuous On-Line Stator Endwinding Vibration Monitor, IRIS Power, Ver 4—Apr. 2015, date unknown, 4 pages.

Extended European Search Report and Opinion issued in connection with corresponding EP Application No. 16185117.5 dated Oct. 24, 2016.

* cited by examiner

INSULATED ACCELEROMETER ASSEMBLY FOR HIGH VOLTAGE ENVIRONMENT

BACKGROUND OF THE INVENTION

The disclosure relates generally to accelerometers, and more particularly, to an insulated accelerometer assembly for a vibrating component in a high voltage environment.

Large industrial machines such as dynamoelectric machines (e.g., generators and motors) vibrate during operation such that monitoring of the vibrations is desired. For example, it is advantageous to monitor vibrations in a generator stator end winding. Because of the high voltage environment, this vibration monitoring is traditionally accomplished using fiber-optic based devices. These fiber-optic devices may use a variety of fiber-optic technologies such fiber bragg grating, intensity based, Fabry-Perot interferometers, etc. and typically measures in 1 or 2 axes. A significant number of sensors, e.g., a minimum of 6, per generator end are needed to gather an accurate representation of the stator end winding vibration. The need for so many expensive fiber-optic sensors leads to costly systems.

Electrical accelerometers, such as Piezoelectric or Micro Electro-Mechanical system (MEMs), are well-known systems to detect motion, and are significantly less expensive than fiber-optic based accelerometers. Accelerometers output signals indicative of the force/motion and are operatively connected to vibrating components for receipt of the signals. Use of electrical accelerometers in high voltage areas such as a generator end winding, however, presents a number of challenges because the sensors can offer a path to ground for the high voltage that can result in harmful scenarios. For example, these accelerometers may present a path for voltage discharge, voltage tracking and/or coronas that may potentially damage end winding components. Devices have been created to provide protection for the accelerometer so they can be used in a high voltage environment, but they require highly complex structural configurations.

BRIEF DESCRIPTION OF THE INVENTION

A first aspect of the disclosure provides an insulated accelerometer assembly for a vibrated component in a high voltage environment, the assembly comprising: an accelerometer; a high dielectric strength potting compound encapsulating the accelerometer; a structurally supporting insulator layer surrounding at least a portion of the high dielectric strength potting compound; and a conductive layer over at least a portion of the structurally supporting insulator layer.

A second aspect of the disclosure provides a dynamoelectric machine comprising: a rotor; a stator including a plurality of stator end windings; an insulated accelerometer assembly coupled to at least one of the plurality of stator end windings, the assembly including: an accelerometer; a high dielectric strength potting compound encapsulating the accelerometer; a structurally supporting insulator layer surrounding at least a portion of the high dielectric strength potting compound; and a conductive layer over at least a portion of the glass epoxy layer.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure provides an insulated accelerometer assembly for a vibrated component in a high voltage environment. A related dynamoelectric machine is also provided.

Figure 1:
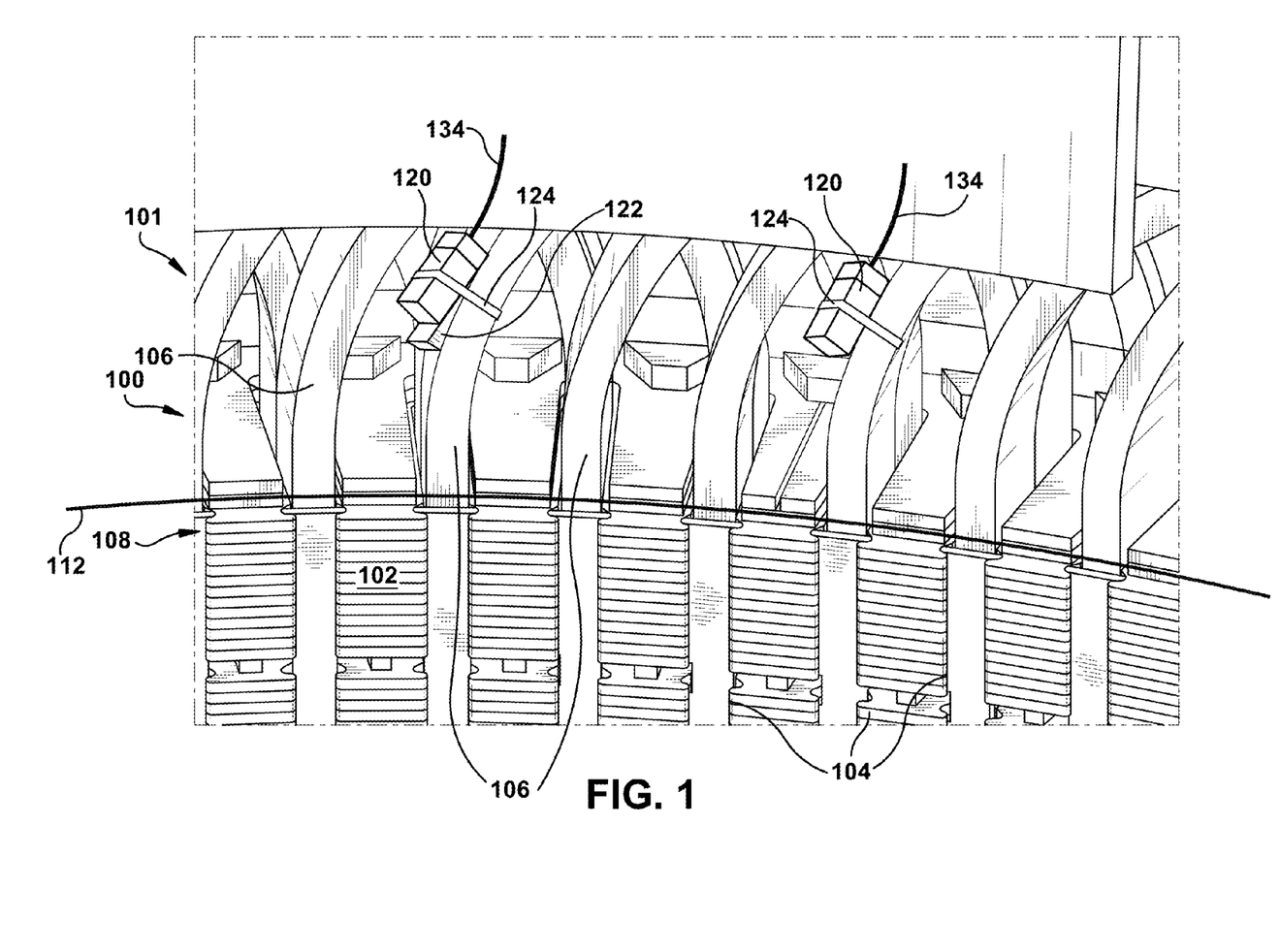
FIG. 1 shows a perspective view of an industrial machine including a vibrated component and insulated accelerometer assembly according to embodiments of the disclosure.

Referring to the drawings, and in particular the perspective view of FIG. 1, embodiments of an industrial machine in the form of, for example, a dynamoelectric machine 101, employing an insulated accelerometer assembly 120 are illustrated. Dynamoelectric machine 101 may include a stator 108 including a stator core 102 having a plurality of slots 104 through which stator end windings 106 extend. Stator end windings 106 represent a vibrated component (also references as 106 herein). Dynamoelectric machine 101 includes a rotor 112 (shown schematically) and stator 108 electromagnetically coupled to the rotor. Rotor 112 and stator 108 may constitute any form of dynamoelectric machine such as a generator, motor, etc. Rotor 112 may be a non-stationary component of dynamoelectric machine 101 and stator 108 may be a stationary component of machine 101. Stator 108 and rotor 112 may be electromagnetically coupled, and during operation, may be used, e.g., to generate electricity or power a load as is known in the art. In any event, a high voltage environment exists thereabout. FIG. 1 also shows insulated accelerometer assembly 120 according to embodiments of the disclosure coupled to two illustrative stator end windings 106. While vibrated component 106 has been described herein as part of dynamoelectric machine 101 to illustrate an example high voltage environment, it is emphasized that the teachings of the disclosure can be applied to any vibrated component.

Figure 2:
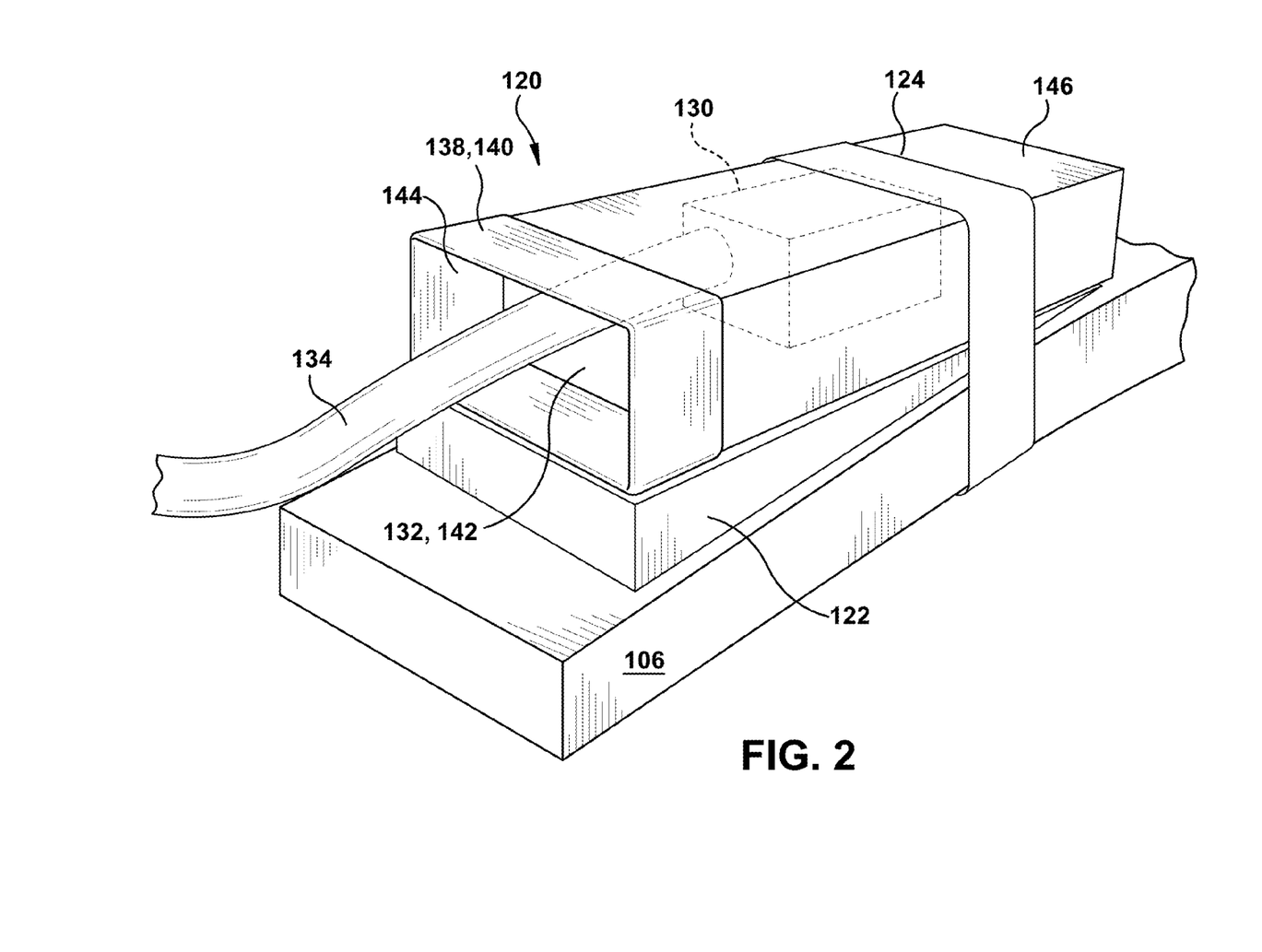
FIG. 2 shows a perspective view of the insulated accelerometer assembly of FIG. 1.

Turning to FIG. 2, a perspective view of an insulated accelerometer assembly 120 adapted for attachment to a vibrated component 106 is shown in accordance with example aspects of the subject disclosure. In one example, as described previously, vibrated component 106 may be a stator end winding, such as present in electric generators or the like. In other examples, the vibrated component 106 may be a rotor winding or other various high voltage elements subject to high vibration. Of course, vibrated component 106 may vary. In addition, the position of assembly 120 may vary within a given vibrated component 106, e.g., from that shown for a stator end winding. Often, the environment of the vibrated component 106 is subjected to large influences from high voltage disturbance. Such influence may be caused by vibrated component 106 or by another proximate component. For ease of description of an example, it may be considered that the area of vibrated component 106 can be subjected to such disturbance influence. Also, vibration is just a single example of force/motion influence that is applied to component 106. Such force/motion may be caused by component 106 itself or may be caused by another proximate component. For ease of description of an example, the component is merely referred to as being vibrated.

In the example shown on the left of FIG. 1 and in FIG. 2, assembly 120 includes an optional mounting base 122 directly or indirectly coupled to vibrated component 106. In one embodiment, mounting base 122 is configured to engage vibrated component 106, e.g., an end winding of dynamoelectric machine 101 (FIG. 1). In particular, mounting base 122 is adapted to engage vibrated component 106 to allow vibrated component 106 to transmit vibration from vibrated component 106 to assembly 120. Mounting base 122 may be made of any material having sufficient strength to withstand the vibration and the high voltage environment, but not interfere with operation of surrounding components, e.g., assembly 120. Mounting base 122 may include, for example, a roving material, or the like, may be wrapped at least partially around vibrated component 106 for coupling assembly 120 to vibrated component 106. Mounting base 122 can be removably or non-removably coupled to vibrated component 106 via various means. In one embodiment, mounting base 122 and assembly 120 may be coupled to vibrated component 106 using a strap 124 configured to mount assembly 120 with mounting base 122 to vibrated component 106, e.g., an end winding. Strap 124 may include any now known or later developed fastening system, e.g., a wet tie typically used in positioning end windings. In addition or in the alternative, an adhesive, such as epoxy or the like, can adhere mounting base 122 to vibrated component 106. In an alternative aspect, mounting base 122 may be separately coupled to vibrated component 106 by straps, fasteners, or the like. Assembly 120 on the right side of FIG. 1 does not include mounting base 122. While two insulated accelerometer assemblies 120 are shown coupled to a respective single vibrated component 106, any number of assemblies 120 may be employed on a given vibrated component and any number of assemblies can be coupled to respective single, vibrated components. Further, it is emphasized that mounting base 122 is optional, and other systems for attachment of assembly 120 to vibrated component 106, e.g., adhesive, straps, etc., alone, can be employed.

Figure 3:
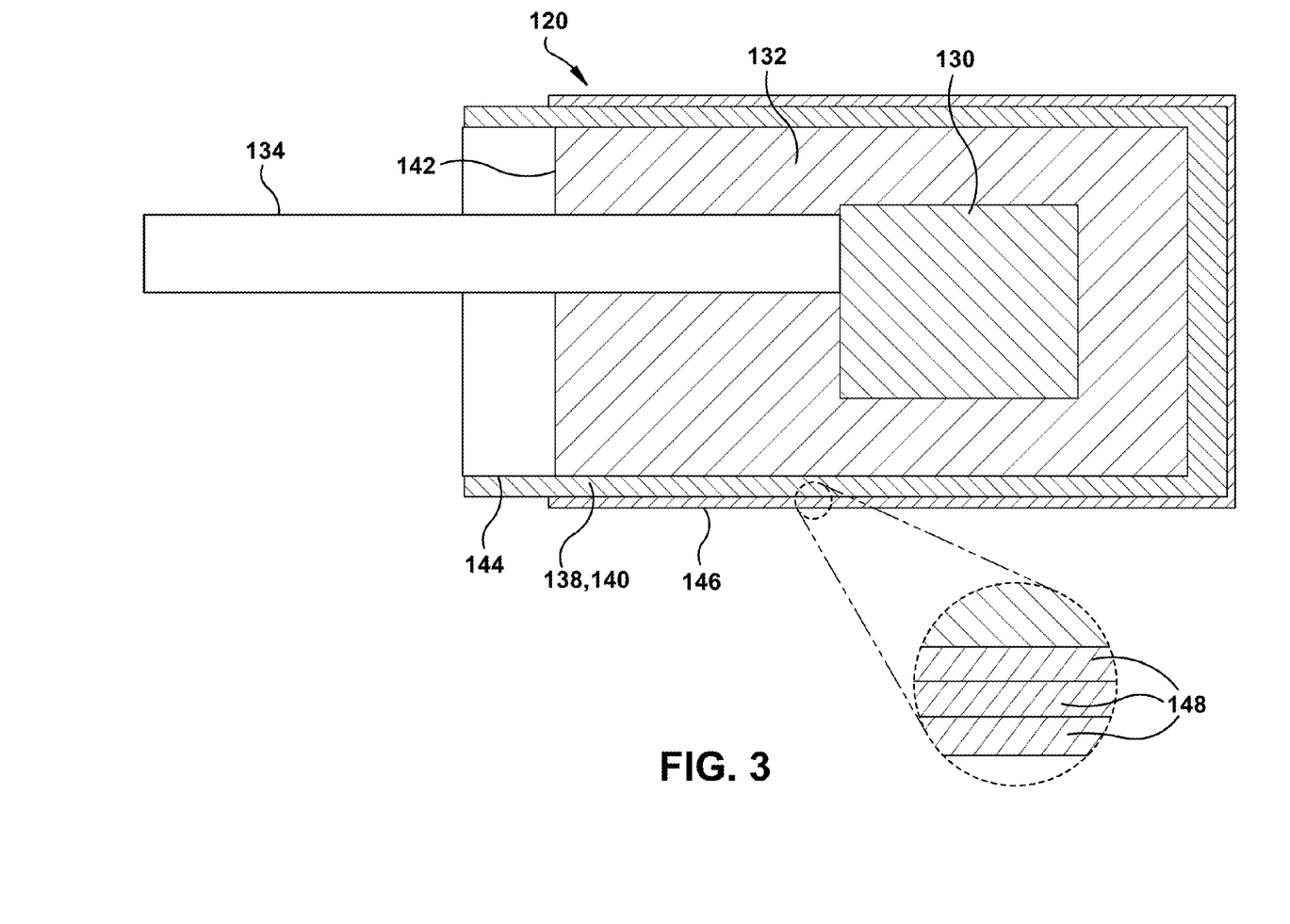
FIG. 3 shows a cross-sectional view of the insulated accelerometer assembly of FIG. 1.

With continuing reference to the perspective view of FIG. 2 and the cross-sectional view of FIG. 3, insulated accelerometer assembly 120 may include an accelerometer 130 encapsulated in a high dielectric strength potting compound 132. Accelerometer 130 may include any now known or later developed accelerometer system capable of withstanding the high voltage environment, which can reach, for example, approximately 60,0000 V. In one embodiment, accelerometer 130 may include single tri-axial accelerometer such as a Micro Electro-Mechanical system (MEMs) capacitive circuit. Example accelerometers used include model 2445 or 2470 available from Silicon Designs Inc of Kirkland, Wash., USA. Accelerometer 130 includes a lead 134 extending therefrom. Lead 134 may include an insulative coating thereabout, e.g., of rubber.

High dielectric strength potting compound 132 may include any material, examples described herein, with a dielectric strength that can withstand 60,000 Volts repeatedly without a breakdown. In one embodiment, potting compound 132 may include, for example, a low to medium viscosity glycidyl ether epoxy resin and a low temperature cure amine hardener. In addition, the potting compound can contain a reactive epoxy diluent to reduce the viscosity of the resin. An example of a liquid, glycidyl ether epoxy resins is a Bisphenol A diglycidyl ether epoxy resins made by Dow Chemical (DER 332, epoxide equivalent weight 172-176, viscosity at 25° C. 4,000-6,000 centipoise (cps)). Mono-, di- and trifunctional epoxy diluents can be used to reduce the viscosity of the potting compound. Example monofunctional epoxy diluents may include: Araldite DY-A (2-ethylhexyl glycidyl ether, epoxide equivalent weight 202-235, viscosity at 25° C. 1-4 cps; example difunctional epoxy diluents may include: Araldite DY 026 (1,4-butanediol diglycidyl ether), epoxide equivalent weight 108-118, viscosity at 25° C.<15 cps; and example trifunctional epoxy diluents may include: Araldite DY-T (trimethylpropane triglycidyl ether), epoxide equivalent weight 111-143, viscosity at 25° C. 100-300 cps. The Araldite brand epoxy diluents are available from Huntsman Corp.; other diluents from other manufacturers may also be employed. Epoxy resins or the epoxy resins containing an epoxy diluent to reduce viscosity are cured with a hardener that will cure below approximately 120° C. One hardener example includes an amine with amino-hydrogen, NH, reactive groups. For example, a hardener may include an aliphatic amine, amidoamine, polyamide based amines and cycloaliphatic amines. An example hardener may include: Aradur 21 (trimethyl hexamethylene diamine), NH equivalent weight 40, viscosity at 25° C.<10 cps. The Aradur brand hardeners are available from Huntsman Corp.; other hardeners from other manufacturers may also be employed. The hardeners with NH functionality are compatible with each other and can be used in combinations to optimize properties such as the reactivity and viscosity of the potting compound.

High dielectric strength potting compound 132 may extend partially along lead 134, i.e., lead 134 is partially encapsulated by compound 132. High dielectric strength potting compound 132 may have any thickness necessary to insulate accelerometer 130, which depends on the size and shape of accelerometer 130. In one example, the compound can be approximately 0.6 centimeters on the sides, 3.8 cm on one end and 2.5 on the other end; however, the thickness may vary drastically depending on the accelerometer used. During formation, a vacuum can be used in the process to remove any air bubbles in high dielectric strength potting compound 132.

A structurally supporting insulator layer 138 surrounds at least a portion of high dielectric strength potting compound 132. Layer 138 may provide additional insulating capabilities and some structural support. In one embodiment, structurally supporting insulator layer 138 includes a glass epoxy layer 140 that may include any glass fabric with high temperature epoxy resin such as but not limited to that generally known as "G-11." Such glass epoxy layer is available from a large number of suppliers such as Plastics International of Eden Prairie, Minn., USA and Polymer Plastics Company of Carson City, Nev., USA. Glass epoxy layer 140 may have a thickness ranging from approximately 0.0158 centimeters to 0.635 cm (¹⁄₁₆ inch to ¼ inch) and may preferably be approximately 0.317 cm (⅛ inch). In one embodiment, glass epoxy layer 140 may extend beyond an end 142 of high dielectric strength potting compound 132, creating an overhang 144. Overhang 144 provides additional protection to lead 134 to further prevent a direct current path to lead 134 (increases distance that must be traveled).

Figure 4:
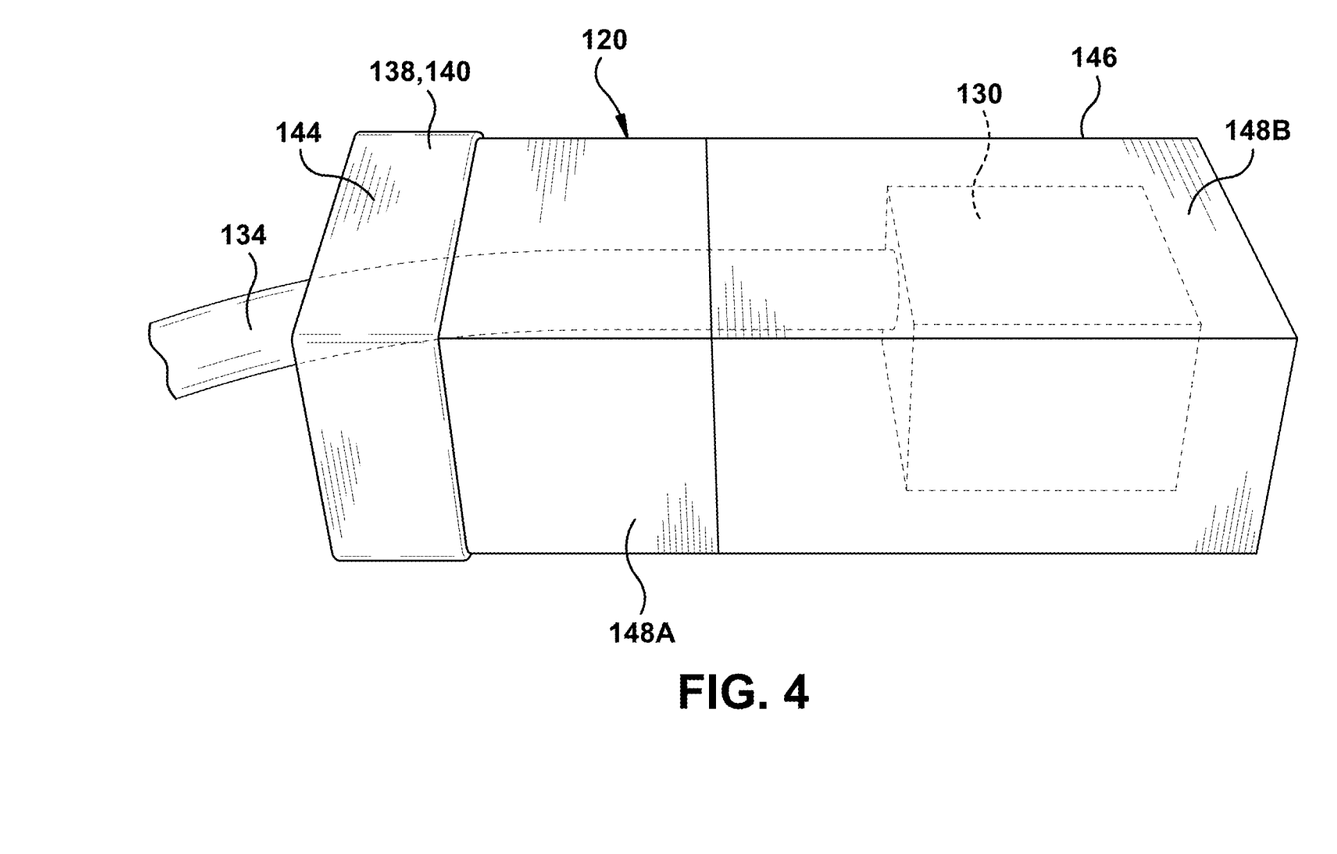
FIG. 4 shows a perspective view of the insulated accelerometer assembly according to another embodiment of the disclosure.

Assembly 120 may also include a conductive layer 146 over at least a portion of structurally supporting insulator layer 138. Conductive layer 146 may provide corona and partial discharge protection. In one embodiment, conductive layer 146 may include at least one conductive silicon carbide coating 148. The coating can be, for example, a polyester or epoxy resin based material having a grit in the range of 300 to 800. In the enlarged view in FIG. 3, a plurality of coatings 148 are illustrated. In the example, 3 layers are provided; however, any number may be possible. In accordance with embodiments of the disclosure, as shown in FIG. 4, at least one conductive silicon carbide coating 148 may includes a plurality of surface portions 148A, 148B having different surface roughness. In this fashion, conductive layer 146 may include a plurality of portions having different conductivity levels, allowing customized voltage tracking. SiC coating 148 can be applied in various manners to achieve the different surface roughness: one grit type around the entire sample, different grit types creating transition points from high grit to low grit, not applying the SiC a certain distance from lead 134, etc. Although only two different surface roughness portions 148A, 148B are shown, any number can be created by using different coatings, layers of coatings, application treatments, etc. As shown in the alternative embodiment of FIG. 5, conductive layer 146, such as silicon carbide coating, may also be applied on lead 134, i.e., the rubber tubing thereof, to prevent voltage built up and electrical tracking along the surface of the lead. This can extend from, for example, 10 to 20 cm along lead 134.

Figure 5:
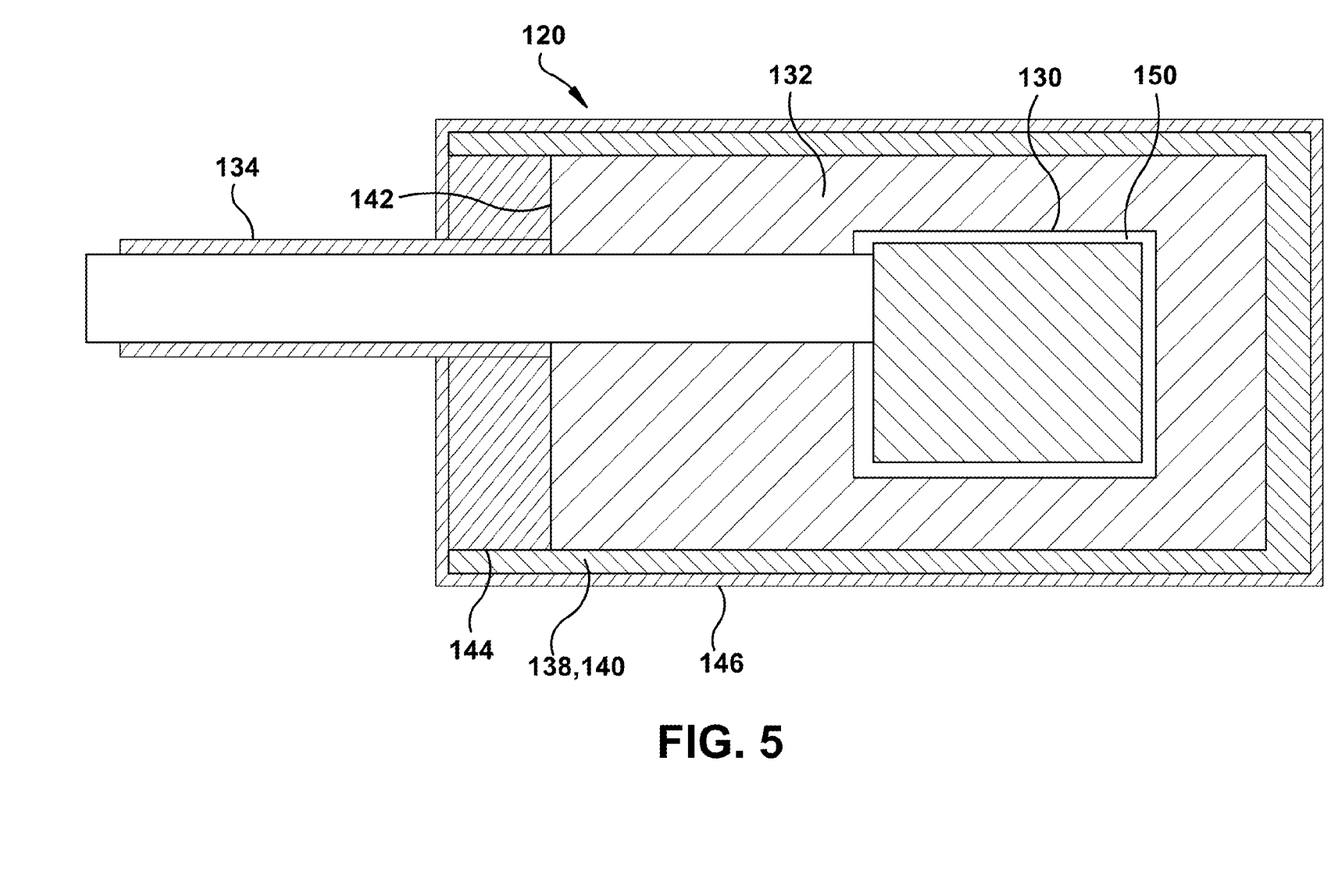
FIG. 5 shows a cross-sectional view of the insulated accelerometer assembly according to another embodiment of the disclosure.

Referring to FIG. 5, in an alternative embodiment, assembly 120 may include an air gap 150 positioned between accelerometer 130 and high dielectric strength potting compound 132 to provide additional insulative effect. In addition, air gap 150 may allow for thermal expansion between accelerometer 130 and high dielectric strength potting compound 132. Air gap 150 may be formed using any now known or later developed technique. In one example, air gap 150 may be formed by applying a soft insert material (not shown) around accelerometer 130 and then applying potting material 132. After curing of potting compound 132, the insert material may then be removed to create the air gap. In another example, air gap 160 may be created by using a two-step potting process. In a first step, a thin layer of a softer, lower glass transition temperature, version of potting material 132 is used to encapsulate accelerometer 130 (e.g., ⅛ of overall thickness). In a second step, a harder final version of potting material 132 is potted over the softer compound to the thickness required. A difference in glass transition temperatures creates air gap 150. The softer material may also allow for thermal expansion flexibility between the harder compound and the accelerometer 130. In any event, air gap 150 may extend partly about accelerometer 130 or entirely around it.

Figure 6:
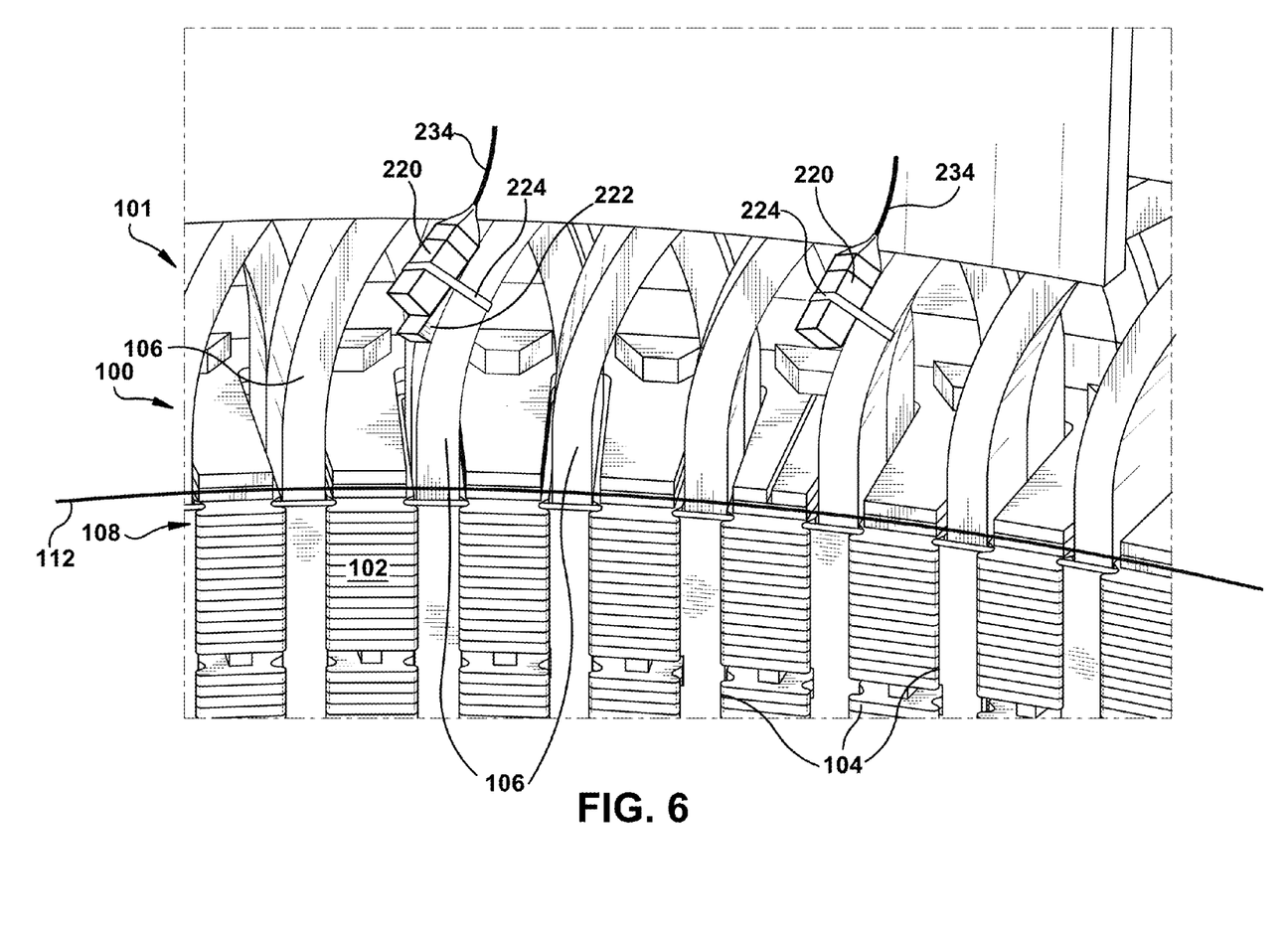
FIG. 6 shows a perspective view of an industrial machine including a vibrated component and insulated accelerometer assembly according to an alternative embodiment of the disclosure.

Referring to FIG. 6, an industrial machine in the form of, for example, dynamoelectric machine 101, employing an insulated accelerometer assembly 220 according to an alternative embodiment is illustrated. Dynamoelectric machine 101 is substantially identical to that shown in FIG. 1. Insulated accelerometer assembly 220 according to embodiments of the disclosure is shown coupled to two illustrative stator end windings 106, one with a mounting base 222 (left), and one without (right).

Figure 7:
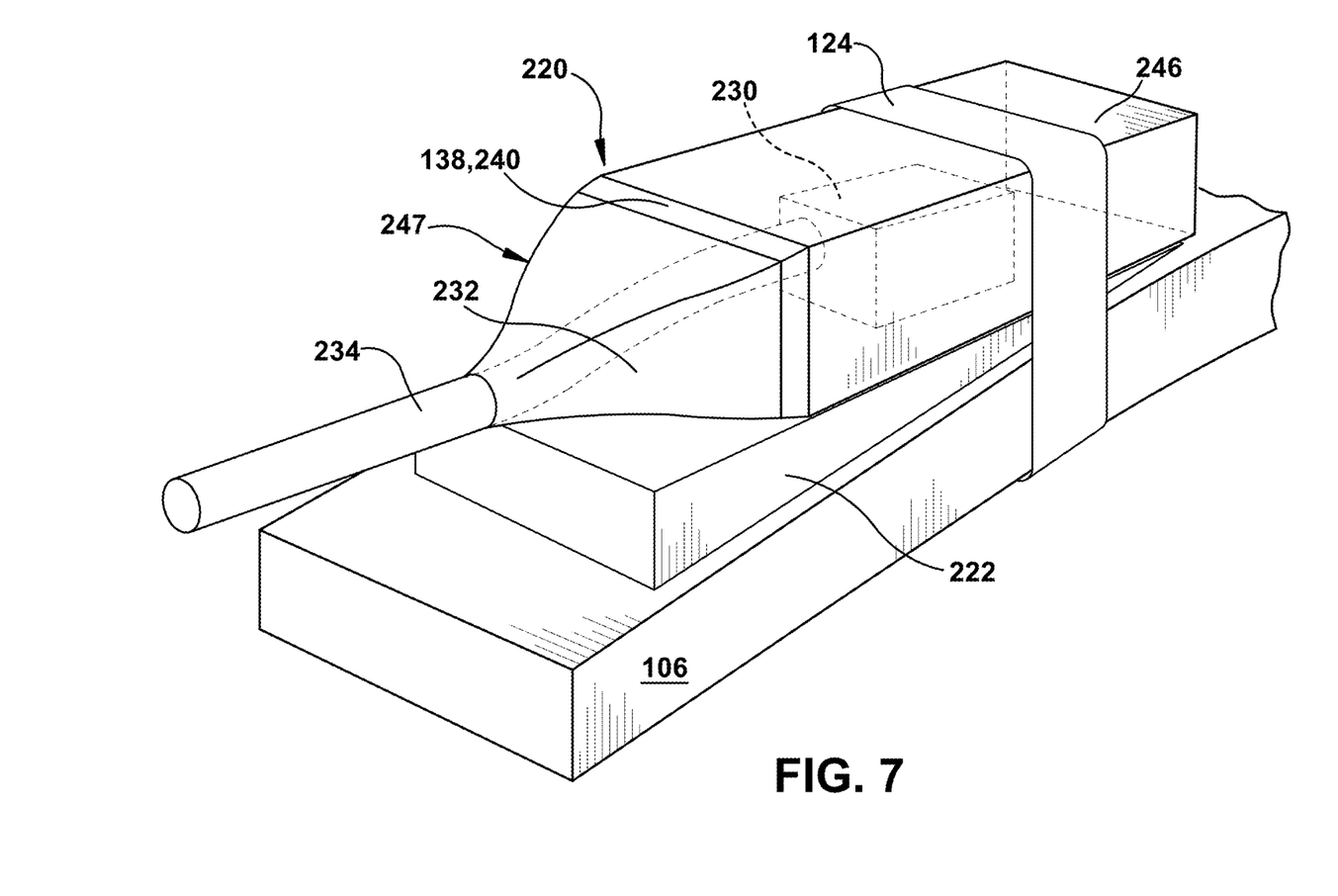
FIG. 7 shows a perspective view of the insulated accelerometer assembly according to FIG. 6.

Turning to FIG. 7, as in the earlier described embodiment, assembly 220 may include optional mounting base 222 directly or indirectly coupled to vibrated component 106. As described herein, mounting base 222 is configured to engage vibrated component 106, e.g., an end winding of dynamoelectric machine 101 (FIG. 6). In particular, mounting base 222 is adapted to engage vibrated component 106 to allow vibrated component 106 to transmit vibration from vibrated component 106 to assembly 220. Mounting base 222 may be made of any material as described herein. In one embodiment, mounting base 222 and assembly 220 may be coupled to vibrated component 106 using a strap 224, as described herein, configured to mount assembly 220 with mounting base 222 to vibrated component 106, e.g., an end winding.

Figure 8:
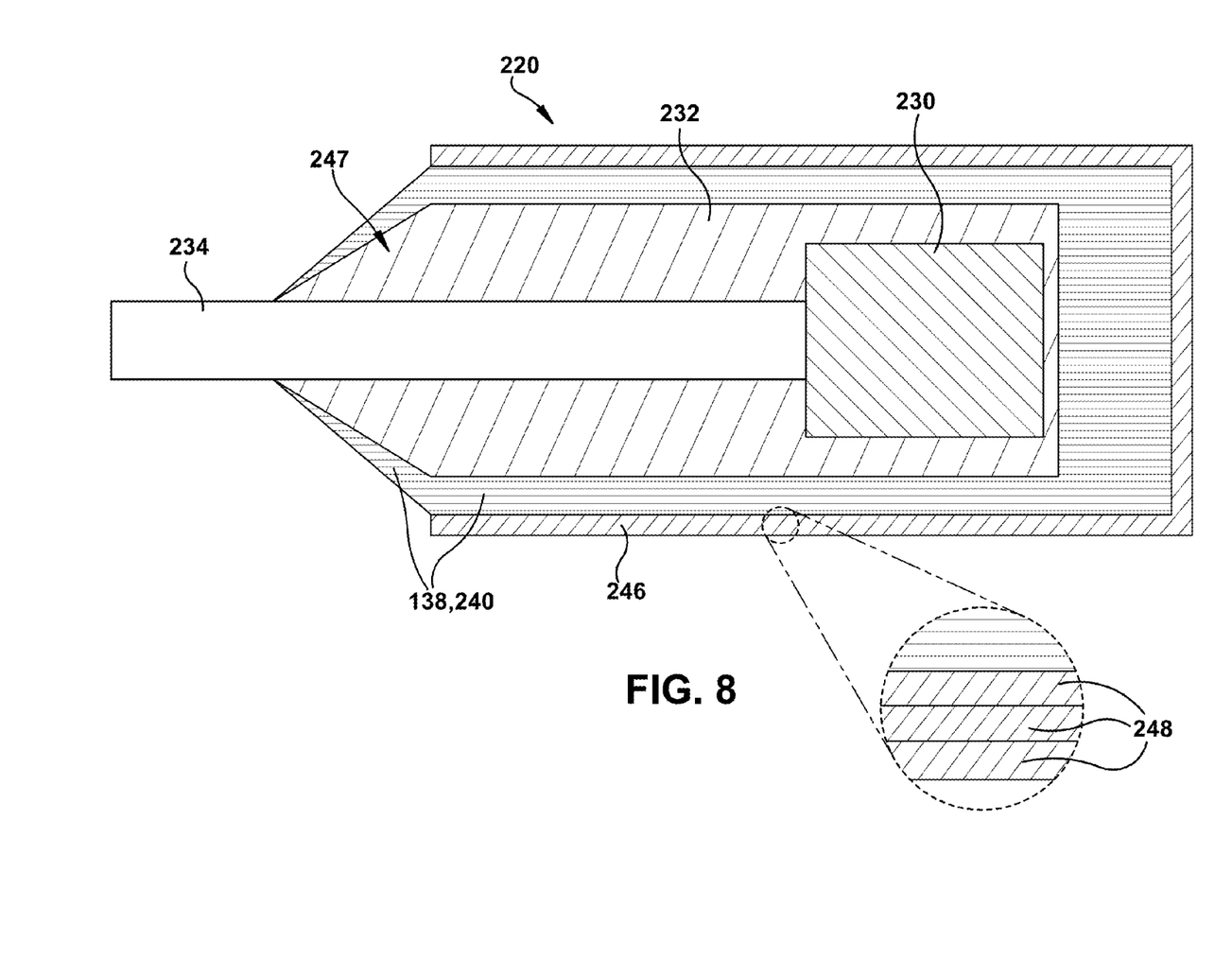
FIG. 8 shows a cross-sectional view of the insulated accelerometer assembly according to FIG. 6.

With continuing reference to the perspective view of FIG. 7 and the cross-sectional view of FIG. 8, insulated accelerometer assembly 220 may include an accelerometer 230 encapsulated in a high dielectric strength potting compound 232. Accelerometer 230 may include any accelerometer as described herein. Accelerometer 230 includes a lead 234 extending therefrom. As noted, lead 234 may include an insulative coating thereabout, e.g., of rubber. Potting compound 232 may have a dielectric strength as described herein, and may include a low to medium viscosity glycidyl ether epoxy resin and a low temperature cure amine hardener. In addition, as described herein, potting compound 232 may include a reactive epoxy diluent to reduce the viscosity of the resin. In any event, potting compound 232 is capable of withstanding the high voltage environment. Here, high dielectric strength potting compound 232 may extend partially along lead 234, i.e., lead 234 is partially encapsulated by compound 232 beyond an edge of conductive layer 246, creating a rounded or pyramidal portion 247 of high dielectric strength potting compound 232 over lead 234. As described herein, high dielectric strength potting compound 232 may have any thickness necessary to insulate accelerometer 230, which depends on the size and shape of accelerometer 230.

In contrast to the first embodiment, in this embodiment, structurally supporting insulator layer 138 may include a mica layer 240 surrounding at least a portion of high dielectric strength potting compound 232. In one embodiment, mica layer 240 may include a number of mica layer(s) 240. In any event, mica layer(s) 240 may provide additional insulating capabilities and some structural support. Mica layer(s) 240 may include any form of mica, e.g., a silicate mineral with a layered structure, found as minute scales in granite and other rocks, or as crystals. In one embodiment, mica layer(s) 240 may take the form of a tape, having adhesive on one or both sides so the layer can readily adhere to potting compound 232, lead 234 and each other. One example includes MICA 77956 manufactured by Vonn Roll; however, other mica layers from other manufacturers may also be employed. Mica layer 240 can be supported by glass cloth, films, or impregnated with a high property resin to obtain the needed electrical properties. Mica layer(s) 240 may have a thickness ranging from approximately 0.1-0.2 millimeters (mm) in thickness, and, in one example, approximately 10-20 layers of the tape may be applied to create a final thickness ranging from 1 mm-4 mm.

Figure 9:
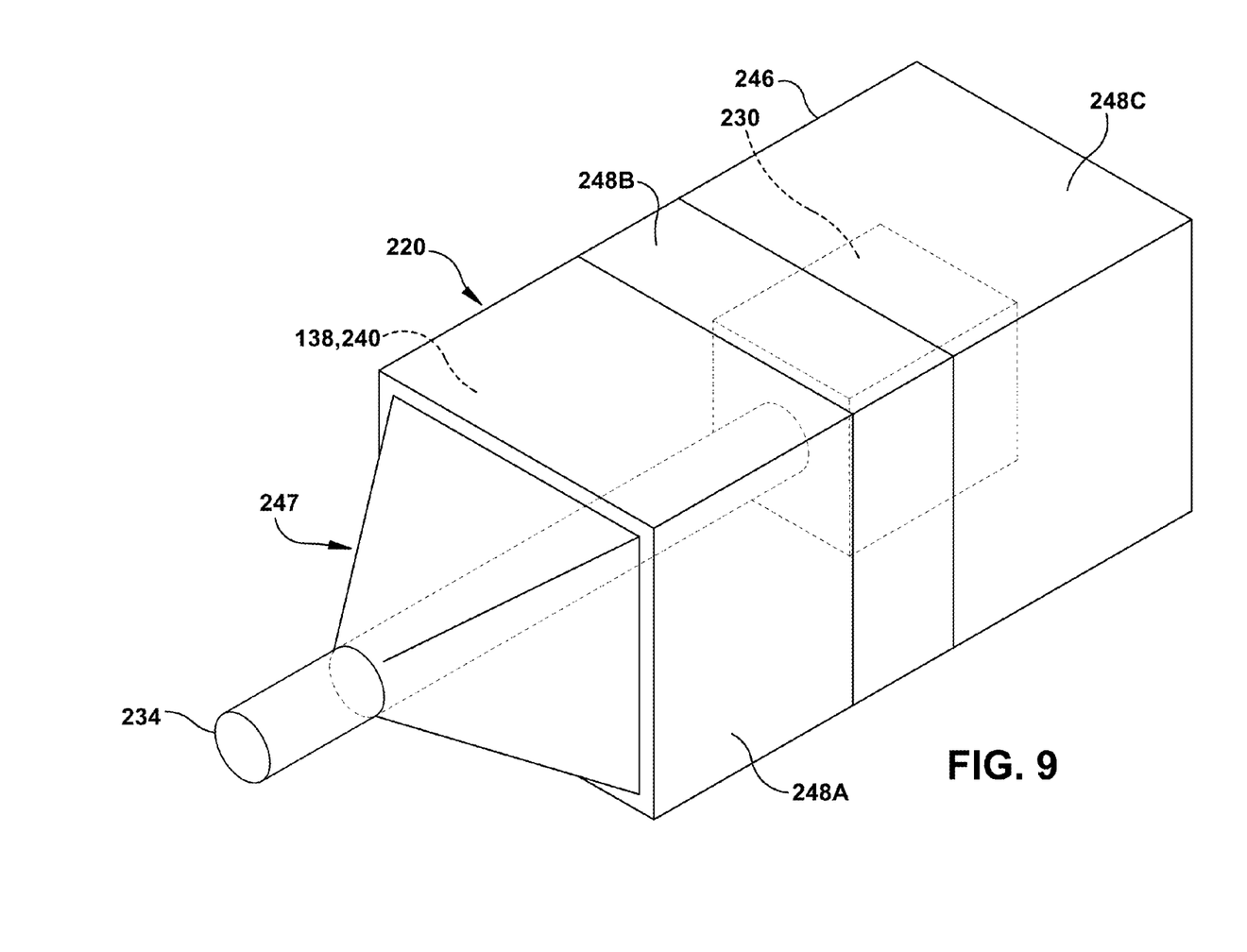
FIG. 9 shows a perspective view of the insulated accelerometer assembly according to another embodiment of the disclosure.

Assembly 220 may also include a conductive layer 246 over at least a portion of structurally supporting insulator layer 138, e.g., mica layer(s) 240. Conductive layer 246 may provide corona and partial discharge protection. As in the first embodiment, conductive layer 246 may include at least one conductive silicon carbide coating 248. In the enlarged view in FIG. 8, a plurality of coatings 248 are illustrated. In the example, 3 layers are provided; however, any number may be possible. In accordance with embodiments of the disclosure, as shown in FIG. 9, at least one conductive silicon carbide coating 248 may include a plurality of surface portions 248A, 248B having different surface roughness. In this fashion, conductive layer 246 may include a plurality of portions having different conductivity levels, allowing customized voltage tracking. As noted herein, SiC coating 248 can be applied in various manners to achieve the different surface roughness: one grit type around the entire sample, different grit types creating transition points from high grit to low grit, not applying the SiC a certain distance from lead 234, etc. Although only three different surface roughness portions 248A, 248B, 248C are shown, any number can be created by using different coatings, layers of coatings, application treatments, etc. As shown in FIG. 8 only, mica layer(s) 240 may extend beyond an end of high dielectric strength potting compound 232 and over and/or onto contact with lead 234; however, this is not necessary. As shown in FIG. 7 and FIG. 9, mica layer(s) 240 may be entirely within conductive layers 146 (FIG. 9) or extend only partially from conductive layer 146 (FIG. 7).

Figure 10:
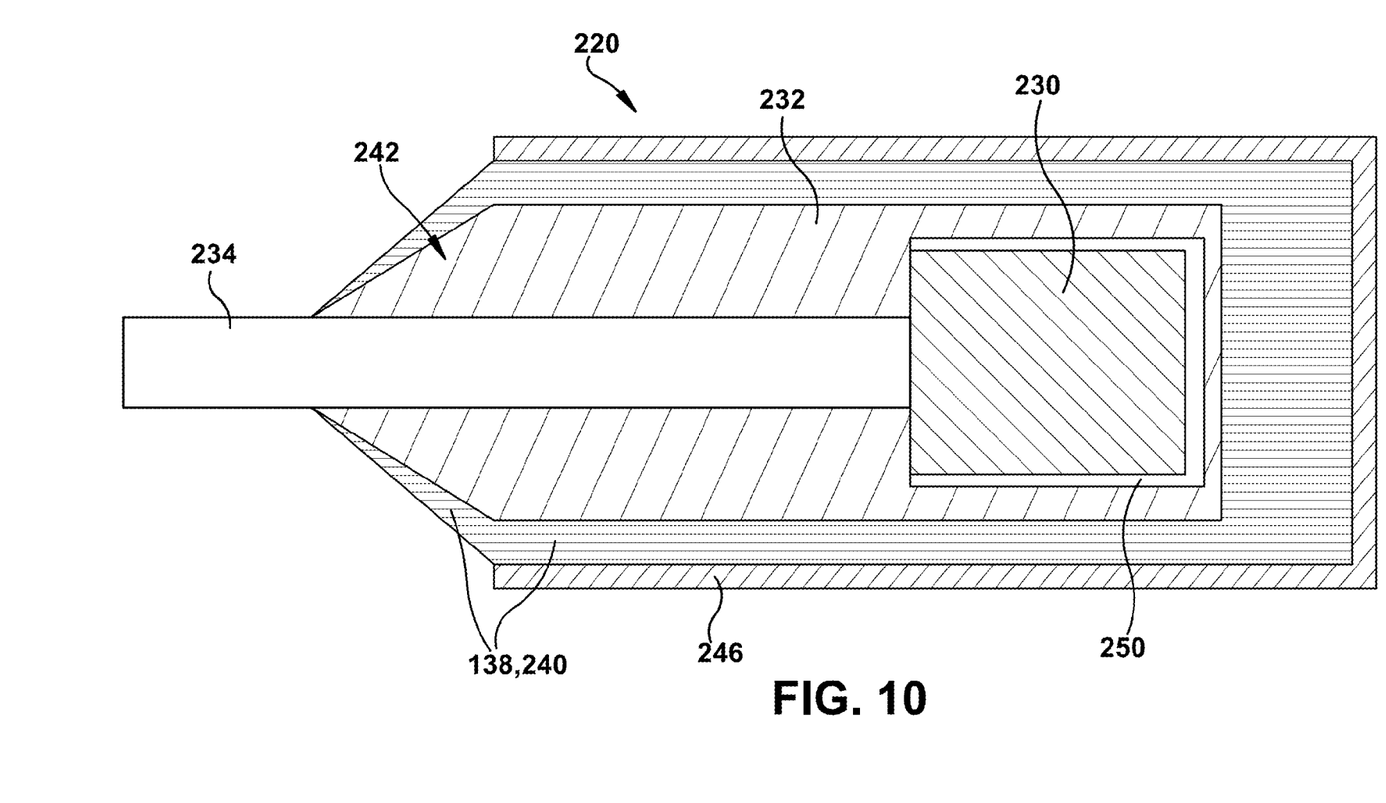
FIG. 10 shows a cross-sectional view of the insulated accelerometer assembly according to another embodiment of the disclosure.

Referring to FIG. 10, in an alternative embodiment, assembly 220 may also include an air gap 250 positioned between accelerometer 230 and high dielectric strength potting compound 232 to provide additional insulative effect, as described relative to the first embodiment. As noted herein, air gap 250 may allow for thermal expansion between accelerometer 230 and high dielectric strength potting compound 232.

Assemblies 120, 220 as described herein provide a significantly lower cost solution compared to fiber optics for monitoring vibration in a high voltage environment such as a stator end winding. The lower cost allows for more instrumentation to be placed on a generator.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Where the term "approximately" or "about" is used, any value plus/minus 10% may be possible.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An insulated accelerometer assembly for a vibrated component in a high voltage environment, the assembly comprising:
   an accelerometer including a lead extending therefrom;
   a high dielectric strength potting compound encapsulating the accelerometer and covering a portion of the lead;
   a structurally supporting insulator layer surrounding at least a portion of the high dielectric strength potting compound, the structurally supporting insulator layer extending beyond an end of the high dielectric strength potting compound to form an overhang; and
   a conductive layer formed over at least a portion of the structurally supporting insulator layer,
   wherein the lead extends from the high dielectric strength potting compound and is surrounded by the overhang of the structurally supporting insulator layer.

2. The assembly of claim 1, wherein the structurally supporting insulator layer includes a mica layer.

3. The assembly of claim 2, wherein the mica layer includes a plurality of mica layers.

4. The assembly of claim 2, wherein the mica layer extends over the high dielectric strength potting compound over the lead.

5. The assembly of claim 1, wherein the structurally supporting insulator layer includes a glass epoxy layer.

6. The assembly of claim 5, wherein the glass epoxy layer extends beyond an end of the high dielectric strength potting compound.

7. The assembly of claim 1, wherein the conductive layer includes at least one conductive silicon carbide coating.

8. The assembly of claim 7, wherein the at least one conductive silicon carbide coating includes a plurality of coatings having different conductivity levels.

9. The assembly of claim 7, wherein the at least one conductive silicon carbide coating includes a plurality of surface portions having different surface roughness.

10. The assembly of claim 1, wherein the conductive layer includes a plurality of portions having different conductivity levels.

11. The assembly of claim 1, wherein the conductive layer contacts and covers a distinct portion of the lead.

12. The assembly of claim 1, further comprising an air gap positioned between the accelerometer and the high dielectric strength potting compound, the air gap surrounding the accelerometer to:
    provide insulation to the accelerometer, and
    allow for thermal expansion between the accelerometer and the high dielectric strength potting compound.

13. The assembly of claim 1, wherein the accelerometer includes a Micro Electro-Mechanical system (MEMs) capacitive circuit.

14. The assembly of claim 1, wherein the vibrated component is a stator end winding of a generator.

15. A dynamoelectric machine comprising:
    a rotor;
    a stator including a plurality of stator end windings; and an insulated accelerometer assembly coupled to at least one of the plurality of stator end windings, the assembly including:
an accelerometer including a lead extending therefrom;
a high dielectric strength potting compound encapsulating the accelerometer and covering a portion of the lead;
a structurally supporting insulator layer surrounding at least a portion of the high dielectric strength potting compound, the structurally supporting insulator layer extending beyond an end of the high dielectric strength potting compound to form an overhang; and
a conductive layer formed over at least a portion of the structurally supporting insulator layer,
wherein the lead extends from the high dielectric strength potting compound and is surrounded by the overhang of the structurally supporting insulator layer.

16. The dynamoelectric machine of claim 14, wherein the structurally supporting insulator layer includes one of: a glass epoxy layer and a mica layer.

17. The dynamoelectric machine of claim 14, wherein the conductive layer includes a plurality of portions having different conductivity levels.

18. An insulated accelerometer assembly for a vibrated component in a high voltage environment, the assembly comprising:
an accelerometer including a lead extending therefrom;
a high dielectric strength potting compound encapsulating the accelerometer and extending partially along the lead;
a structurally supporting insulator layer surrounding at least a portion of the high dielectric strength potting compound, the structurally supporting insulator layer extending beyond an end of the high dielectric strength potting compound to form an overhang; and
a conductive layer formed:
over at least a portion of the structurally supporting insulator layer, and
within the overhang formed by the structurally supporting insulator layer, the conductive layer formed within the overhang formed by the structurally supporting insulator layer directly contacting the high dielectric strength potting compound and a portion of the lead.

* * * * *